Figure 1:
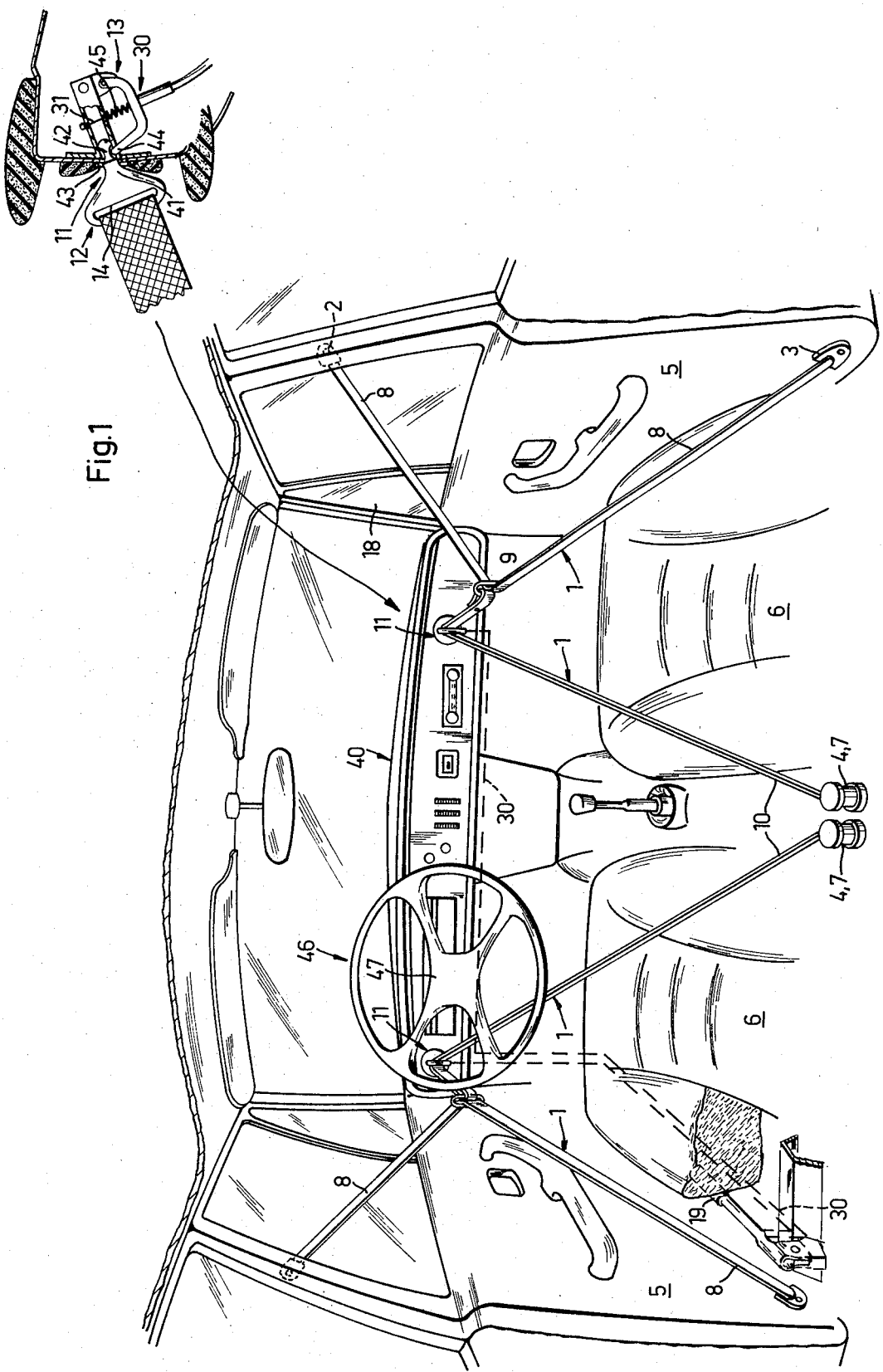

# United States Patent [19]

Pilhall et al.

[11] 3,865,397
[45] Feb. 11, 1974

[54] VEHICLE SAFETY BELT SYSTEMS

[75] Inventors: Stig Tore Lennart Pilhall, Trollhattan; Pehr Harald Benedictus Schalin, Vastra Frolunda; Nils Ivar Bohlin, Askim,all of Sweden; Rolf Hermann Forsberg, Lillestrom, Norway

[73] Assignee: A B Volvo, Goteborg, Sweden

[22] Filed: Oct. 25, 1972

[21] Appl. No.: 300,676

[30] Foreign Application Priority Data
Oct. 27, 1971  Sweden............................ 13639/71

[52] U.S. Cl............................................ 280/150 SB
[51] Int. Cl............................................. B60r 21/10
[58] Field of Search................. 280/150 SB; 180/82

[56] References Cited
UNITED STATES PATENTS
3,727,944  4/1973  Wize............................ 280/150 SB
3,764,161  10/1973  Bright............................ 280/150 SB Primary Examiner—Robert R. Song
Attorney, Agent, or Firm—Young & Thompson

[57] ABSTRACT

A vehicle safety belt system with which at least one safety belt is attached to at least one attachment point in the vehicle door adjacent the seat served by the belt and to a further attachment point on the opposite side of the seat. At least one of the belt attachment points cooperates with an automatic belt collecting device which holds the belt in tension and the belt is provided with a latch member arranged to cooperate with a belt holding device located on a vehicle portion generally in front of the vehicle seat and with which the belt can be held extended in front of and away from the seat. The belt holding device incorporates latching means connected to a conventional, actuatable vehicle component, the manner of connection being such as to operate the latching means upon actuation of the conventional vehicle component.

4 Claims, 4 Drawing Figures

VEHICLE SAFETY BELT SYSTEMS

The present invention relates to a motor vehicle provided with self-adjusting safety belts which are attached to at least one attachment point in the vehicle door adjacent the seats served by respective belts and which have a further attachment point located on the opposite side of respective seats, and wherewith at least one of the belt attachment points is provided with a latchable belt collecting device.

The expression "self-adjusting" as used in the present context is meant to describe a vehicle safety belt which automatically adjusts itself to the body of the seat occupant without conscious effort or direct manipulation on the part of the occupant. The self-adjustment of the belt takes place either before the vehicle is driven away or in conjunction with preparing the vehicle for driving.

A number of safety belt systems of this type are known to the art. With one such known system the safety belt has three attachment points, two of which are located in the vehicle door while the third, which is provided with a roller type collecting device, such as an inertia reel, is located on the centre longitudinal line of the vehicle. This system, however, has the disadvantage that the belt impedes passage of a person into and out of the vehicle seat, unless the belt is held to one side in some way or another. This disadvantage is particularly manifest when the door cannot be opened to its full extent, for example when the vehicle is parked in a congested parking place.

With another known type of vehicle provided with self-adjusting safety belts, the belt is secured at two attachment points located on the longitudinal centre line of the vehicle, while the third attachment point is located in the door adjacent the seat to be served by the belt. This third attachment point is capable of being mechanically moved along the inside of the door. This arrangement requires complicated and expensive apparatus, without fully circumventing the disadvantages encountered with the safety belt system first mentioned. Furthermore, the arrangement requires that one of the belt attachment points be placed in a high position in the vehicle, a condition which is difficult to fulfil with present day vehicle constructions. The two belt attachment points in the centre of the vehicle also results in a so-called "reverse" safety belt arrangement, which can be to particular disadvantage with certain types of accidents or collisions.

One object of the present invention is to provide a vehicle equipped with a safety belt system with which the belt can be released from its point of suspension away from the seat occupant, without direct manual activation, whereafter the belt adjusts itself to the body of the seat occupant served by the belt.

A second object of the invention is to facilitate removal and re-suspension of the belt subsequent to completing a journey. Another object of the invention is to render it impossible to drive the vehicle without the safety belt applied.

These objects are obtained by means of the safety belt system according to the invention, which is mainly characterized by means for releasably holding the belt extended away from and in front of the seat served thereby, and means which connect said belt holding means with at least one conventional actuatable vehicle component and which is arranged to operate said belt holding means in response to activation of said vehicle component, so as to free the belt for collection in said belt collecting device. With a preferred embodiment of a vehicle fitted with a safety belt system according to the present invention, the safety belt holding means is operated in response to the activation of at least one conventional vehicle component or member which must be manipulated or actuated in order to prepare the vehicle for driving or for driving said vehicle. An example of such a vehicle component in this respect is found in the handbrake of the vehicle, which when moved to the brake-on position corresponds to the latching position of the latching means and the brake-release position of which corresponds to the released position of the latching means.

Figure 2:
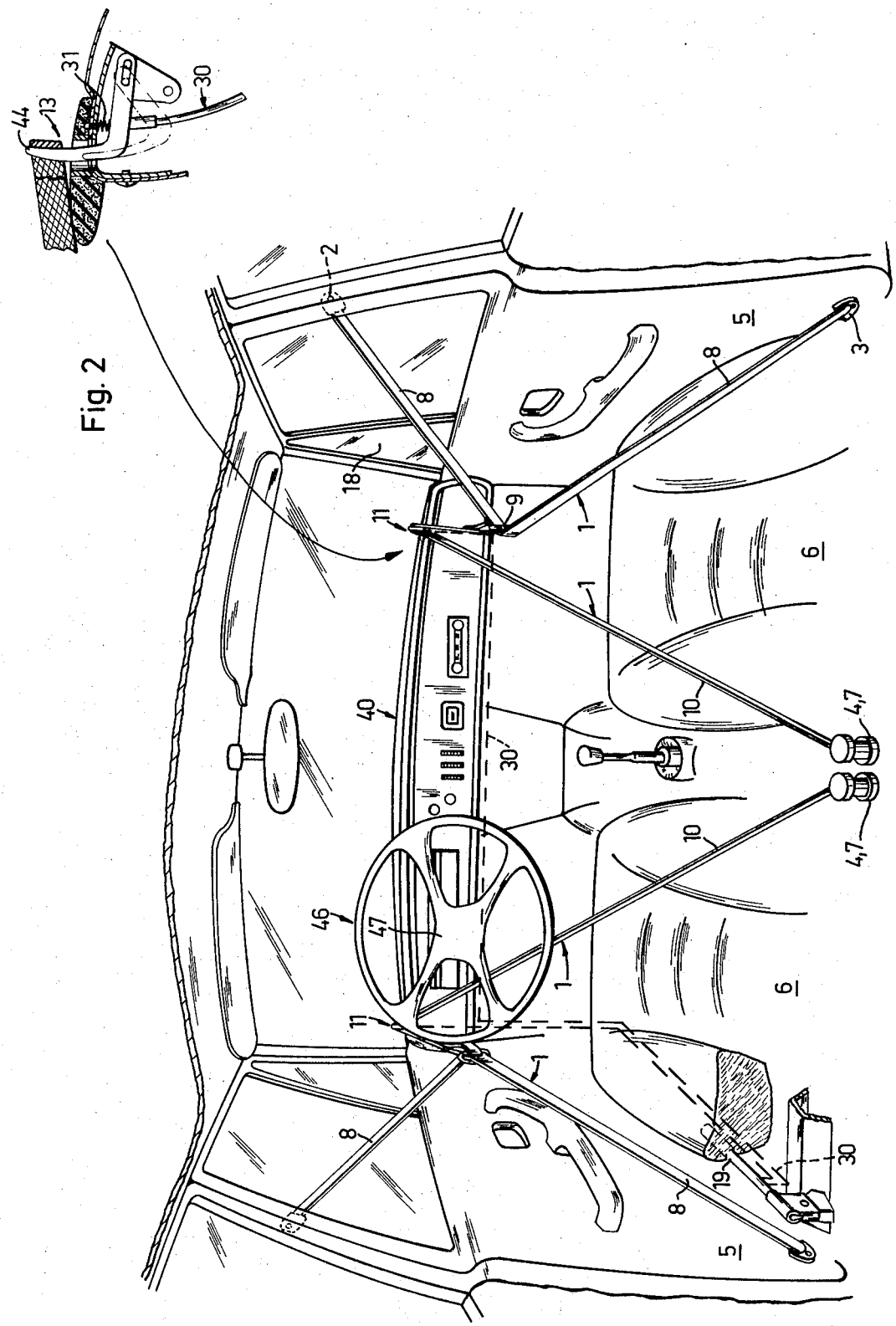
Figure 3:
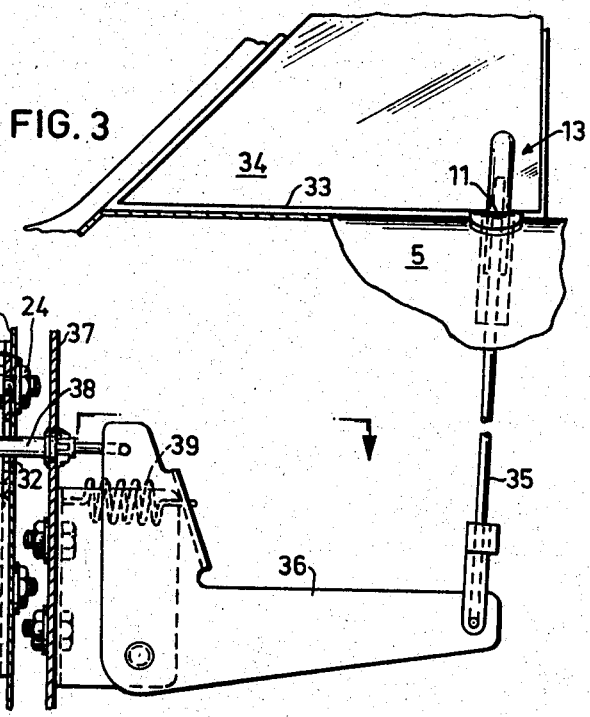
Figure 4:
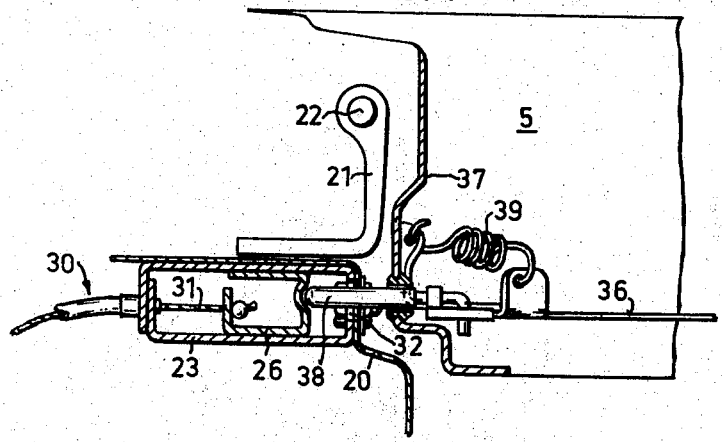

The invention will now be described in more detail with reference to a number of embodiments thereof illustrated in the accompanying drawing, additional features of the invention and advantages afforded thereby being made apparent in connection therewith. In the drawing, FIG. 1 is a view of the front, interior portion of the vehicle provided with one embodiment of the safety belt system according to the invention, seen from the rear of the vehicle. The safety belts are of the three point type, and each illustrated seat is provided with its respective safety belt. The safety belts are suspended from belt holding or suspension means located on the side of the instrument panel facing the vehicle seats, so as to be held away from the vehicle seat until such time as the latching means is activated. The Figure also includes an enlarged view of a cross section through the instrument panel with the safety belt suspended from the suspension means. FIG. 2 is a view corresponding to the view of FIG. 1, but illustrating another embodiment of the safety belt holding mechanism. FIG. 3 illustrates a third embodiment having a latching means mounted to the vehicle door and means for activating the latching means in response to the activation of two different vehicle components. FIG. 4 is a section through the line IV—IV in FIG. 3.

FIGS. 1 and 2 illustrate two different embodiments of a vehicle provided with a safety belt system according to the invention. The safety belts are indicated generally by the reference numeral 1. Since the system is identical for the two belts illustrated, only one safety belt will be referred to hereinafter. The belt 1 is secured at three attachment points, of which two, 2, 3 are arranged on a door 5 located adjacent the seat 6 to be served by the belt. The third attachment point 4 is arranged in the centre of the vehicle and includes a belt collecting device 7, which attempts to draw in the belt, e.g. by rolling up the same, such as with an inertia reel.

The three belt attachment points 2-4 may be arranged differently to that illustrated in the Figures, which is particularly the case when applying the system to the rear seats of the vehicle. There is nothing, however, to prevent two of the attachment points 2-4 being arranged in the centre of the vehicle and a third on the vehicle door. Furthermore, more than one collecting device 7 may be arranged for each belt and the position of the attachment points carrying such devices may also be different to that illustrated.

The tension forces occurring on the attachment points 2, 3 located in the door 5 are transmitted from the belt 1 to the vehicle body by means of suitable devices, such as pins or hooks (not shown) which securely join the door and the vehicle body when the door is closed. If the strength of the door itself is sufficient to absorb such tension forces, however, the provision of such devices may be dispelled with.

With the embodiments illustrated in FIGS. 1 and 2, the two door attachment points are joined with a belt section 8. The belt section 8 is provided with a slide loop 9 to which a second belt section 10 is attached. The belt section 10 is connected with the belt collecting device 7, which in the illustrated embodiment is screwed to the driving shaft casing immediately behind the front seats.

In addition to the three attachment points, there is also provided for each belt 1 a belt holding or suspension means 11 in which the belt 1 can be secured, provided that certain conditions are fulfilled.

With the illustrated embodiment, a latch member 12 is slidably arranged on the belt section 10 and is constructed so that the belt can be releasably latched in the suspension means by means of a latching device 13 embodied in the belt holding means and including a housing and lean-in member cooperating with a movable tongue element as hereinafter described. The latching device is capable of being operated between two positions, a latching position and a released position, such that when in its latching position — as is the case in FIGS. 1–3 — it is able to retain the latch member 12 in a rest position in which the safety belt is held firmly away from confines of the seat which it serves, provided of course that the latch member has been inserted in the belt holding or suspension means. When the latching device 13 occupies its released position, it is no longer able to retain the latch member 12.

As an alternative to the slidable arrangement of the latch member 12 relative to the belt section 10, the latch member may be provided with a slot 14 located at some suitable angle and arranged to permit the belt section 10 to slide therein.

When the latch member 12 is in its rest position, retained by the latching device, and the door is opened, the belt section 10 will slide through the slot 14 in the latch member 12, while a corresponding portion of the belt will be collected in the device 7. As the door is opened, the belt sections 8, corresponding respectively to the chest support and hip support portions of the belt, will lie closely adjacent the inside of the door 5, throughout all intermediate positions of the door between its fully closed and fully opened position, thereby providing complete freedom of passage for persons entering and leaving the vehicle.

The belt system of the present invention may also be arranged so that the slide loop 9 and latch member 12 of the belt are formed by one and the same element. Thus, the latch member 12 may be attached to the junction point 9 between the three sections 8, 8 and 10 of the belt.

FIGS. 1 and 2 also illustrate an enlarged sectional view of the instrument panel 40, the section passing through the suspension means 11 substantially in the longitudinal direction of the vehicle.

With the embodiment illustrated in FIG. 1, the latch member 12 includes a stud 41 provided with a circumferentially extending groove 42, arranged such that the stud is able to function as a hooking element. The suspension means 11 is provided with a preferably conical guide surface 43, to facilitate insertion of the stud or hooking element 41, the end of which may be provided with a corresponding surface. The latching device 13 includes at least one latching tongue 44 which moves generally transversally into a housing and which when the latching device 13 occupies its latching position engages the groove of the hooking element 41 when the latching member is inserted into the belt suspension means.

As an alternative to the illustrated embodiment, the hooking element 41, 42 can be provided with two or more studs having annular grooves arranged thereon. The stud may also be replaced with a hook-like member or an eye-shaped member or some other similar device.

The position taken by the latching device is determined by a tension spring 45, which biasses the latching device to its latching position, and by a Bowden-cable arrangement, the wire 31 of which moves the latching device to its released position when tension is applied to the wire, as hereinafter described. The Bowden-cable can, of course, be replaced with other movement transmission element, either of mechanical or non-mechanical operation.

With the embodiment illustrated in FIG. 2, the suspension means 11 is arranged on the upper face of the instrument panel 40 instead of on the side of the panel facing the vehicle seat 6, as with the embodiment of FIG. 1. As will be seen from the enlarged sectional view of FIG. 2, the latching device 13 of this embodiment has the form of a hook which projects through the upper face of the instrument panel 40. As will be readily perceived, with this embodiment of the latching device, the belt section 10 can be simply placed in front of the latching device 13 and permitted to slide therealong. Alternatively, the belt section 10 may be provided with an opening (not shown), by means of which the belt can be hooked on to the latching device 13 when the latch member 12 or the belt section 10 is connected so that the safety belt as a whole is in its rest position. As will be understood from the aforegoing, the belt cannot be secured in its rest position until the latching device 13 occupies its latching position. In this respect, it is preferred that the latching device 13 normally occupies its latching position, which can be effected by the arrangement of a spring or the like (not shown).

The suspension means 11 is preferably arranged in a portion of the vehicle located in front of, obliquely in front of and/or obliquely above the seat served by the belt. The suspension means shall also lie within convenient reach of the seat occupant, and is suitably placed on or in the vicinity of the vehicle instrument panel 40, as with the embodiments illustrated in FIGS. 1 and 2. Another suitable portion of the vehicle in this respect is the steering wheel 46, e.g. the steering wheel hub 47. The forward portion of the vehicle door located adjacent the seat served by the belt is also a convenient vehicle portion, as is also the window panel 33 inside the ventilation pane of the door, as shown in 34 in FIGS. 3 and 4. Other suitable vehicle portions in this respect are those on or in the vicinity of a back support, located in front of the rear seat, and a portion of the roof or a member attached to the roof.

A number of alternative arrangements are conceivable for activating the latching device 13. One common factor for all such arrangements, however, is that the latching device is activated in response to the manipulation or activation of at least one vehicle component or member determinative for preparing the vehicle for driving or for driving the vehicle.

One example of what is meant by the activation of at least one vehicle component or member determinative for preparing the car for driving or for driving the car, is found in the handbrake of the vehicle, shown at 19 in the drawing, which must normally be applied when parking the vehicle and released when driving the vehicle. Other examples of conventional vehicle components whose process of activation or manipulation can be utilized to operate the safety belt suspension means include the accelerator pedal, the clutch pedal and the vehicle ignition system, all of which must be manipulated before the vehicle can be driven away. When using the hand brake as the safety device activating means, the first position of the hand brake, i.e. the on position, may be made to correspond to the latched position of the suspension means, while the off position of the hand brake can be made to represent the released position of said suspension means.

Another example in the present respect is one in which the inertia forces produced by a conventional device in the vehicle or a device especially embodied for the purpose are used to activate the suspension means. Such a device may be arranged to provide the necessary impulse to the suspension means as the result of vehicle acceleration when starting. It is also conceivable to arrange for an impulse to be provided to the suspension means as a result of a local change in position of a vehicle seat or in response to a pressure in excess of a limit value being applied to the seat. The same form of arrangement can be applied to the back support of the seat, or as aforementioned, an electric impulse can be transmitted from the ignition system etc.

In addition to using the aforementioned devices to activate the belt suspension means, the system may be modified so that the seat occupant is required to move a further conventional vehicle member to a position normal for normal driving conditions. Such an element is the door adjacent the seat served by the belt, the normal position of the door being, of course, in closed position when driving.

Other movable conventional vehicle elements include the door handle, the door lock etc. The aforementioned devices described as primary suspension means activating devices may also be used as auxiliary devices in combination with other primary devices. For example, an arrangement can be envisaged whereby an impulse from both the driving seat and the passenger seat is required to release the safety belt serving the passenger seat.

An embodiment in which the vehicle door serves as the auxiliary suspension means activated device is illustrated in FIGS. 3 and 4. FIG. 3 illustrates in side view portions of a vehicle door 5 and a vehicle body 20 in the proximity of a door hinge. The Figures also show a number of elements installed in these vehicle portions and essential to the embodiment of the present invention. The stationary or fixed portion 21 of the door hinge and the rotation shaft 22 are indicated in the FIG. 4.

Attached to the stationary portion of the vehicle body 20 by means of bolts 24 is a housing 23. Pivotally mounted at the bottom of the housing 23 is a shaft 25 around which a movable element 26 is pivotally mounted. The element 26 can be rotated between a blocking position and a withdrawn position. The position taken by the element 26 is determined by a spring 27, which biases the element to the blocking position and by the operating position to which the primary, conventional vehicle device used for activating the suspension or belt holding means is moved. If this device, which in the illustrated embodiment is in the form of the hand brake 19, is moved to its first position, i.e. the brake-on position, the movable element 26 is mechanically moved to its withdrawn position, which in FIG. 3 implies that the element is rotated to the left against the force exerted by the spring 27. If the primary activating device is instead moved to its other operating position, i.e. its brake-off position, the spring 27 is able to exert itself to move the element 26 until a support plate 28 cooperating therewith engages a wall 29 forming part of the housing 23 and bolted to the vehicle body 20, this latter position corresponding to the blocking position of the element 26.

With the exemplary embodiment, the movement of the hand brake 19 is transmitted to the element 26 mechanically by means of a Bowden-cable 30, the wire 31 of which when in tension turns the upper portion of the movable element to the left, as seen in FIG. 3. The same mechanical movement transmission system is used with the embodiments of FIGS. 1 and 2 for transmitting movement of the hand brake 19 to the latching device 13.

With the embodiment of FIGS. 3 and 4, the movable element 26 may occupy two different positions, a blocking position and a withdrawn position. When occupying its blocking position the element 26 blocks a through-passing hole 32 arranged in the wall 29 and the vehicle body 20, and uncovers the hole when moved to its withdrawn position. The hole 32 is arranged in an edge surface of the door post 20 surrounding the door 5.

With the embodiment of FIG. 3, the suspension means 11 has been placed on the upper surface of the window panel 33, inwardly of the ventilation glass 34. The latching device 13 projects up through the window panel 33 and is thereby in its latching position. The latching device 13 is mechanically connected, via a system of links 35, 36, with a second element 38 displaceably mounted in the hinge of the door 5. When the door 5 is closed, the element 38 is located opposite the hole 32, in a position wherein it is able to pass freely through the hole.

The element 38 is movable between a first and a second limit position. Provided that no external forces are caused to act on the element 38, a tension spring 39 will retain the element in its first limit position. This is the case, for example, when the door is open. When the door member occupies its first limit position, the latching device 13 is moved to its latching position through the system of links 35, 36. If the element 38 is moved by an external force to its second limit position, against the force of the spring 39, the link system 35, 36 will move the latching device 13 to its released position.

If, instead, the door 5 is closed, as indicated in FIGS. 3 and 4, and the handbrake 19 occupies the brake-on position, such as when the vehicle is parked or has not yet been placed in the state of readiness for driving, the movable element 26 occupies the withdrawn position shown in the Figures. When the door 5 is closed the element 38 thus remains in its first limit position, since it is freely insertable through the opening 32 in the position shown in FIGS. 3 and 4. Thus, while the hand brake is applied, closing of the door 5 does not cause the latching device 13 to be actuated, and hence the safety belt 1 remains in its rest position in the suspension point 11. Thus, closing of the vehicle door when the vehcile is parked does not cause the safety belt to be released from the belt suspension means.

When the hand brake 19 is released, subsequent to closing the door of the vehicle, the wire 31 is tensioned and the spring 27 will move the movable element 26 to its blocking position. The support plate 28 of the element therewith moves the element 38 to the right, as seen in FIGS. 3 and 4, until it reaches its second limit position. The system of links 35, 36 will then move the latching device 13 downwardly to its released position, whereupon the member 12 of the belt 1 is released and the belt adjusts itself to the body of the seat occupant, superfluous lengths of belt being collected in the collecting device 7.

Should the brake 19 be released before the door 5 is closed, the element 38 is pressed in by the movable element 26 as the door is closed, said element 26 being already in its blocking position. Thus, the safety belt is released and the belt will adjust itself to the body of the seat occupant immediately the door 5 is closed.

With the third embodiment of the present invention, the belt holding or suspension means 11 is mounted adjacent the hinge 22 of the door 5. The advantage afforded by this arrangement is that the belt section 10 need not slide between the slot 14 of the latch member 12 or along the latching device 13 in the embodiment of the safety belt system where no latch member 12 is provided, or at least need slide to only a slight extent.

As previously mentioned, the invention is not restricted to the illustrated and described elements nor to the methods in which the movement of such elements is transmitted to the safety belt suspension means but can be modified within the scope of the accompanying claims. For example, the movement transmission means may be vacuum-operated or pneumatic devices.

What we claim is:

1. A vehicle having a door and an adjacent seat and at least one self-adjusting sefety belt, means attaching said belt to at least one attachment point on the door adjacent said seat served by said belt, means attaching said belt to a further attachment point on the opposite side of said seat, at least one of said belt attachment means including a latchable belt-collecting device applying a tension force to said belt, means for detachably holding said belt extended away from and in front of said seat, and means connecting said belt-holding means with at least one conventional vehicle component to detach said belt from said belt-holding means in response to activation of said vehicle component to release said belt for collection in said belt-collecting device, said vehicle having a handbrake, said belt-holding means being actuated by movement of the vehicle handbrake from its applied position to its released position, said applied position of said handbrake corresponding to a latching position of said holding means, said released position of said handbrake corresponding to a detached position of said holding means.

2. A vehicle having a door and an adjacent seat and at least one self-adjusting safety belt, means attaching said belt to at least one attachment point on the door adjacent said seat served by said belt, means attaching said belt to a further attachment point on the opposite side of said seat, at least one of said belt attachment means including a latchable belt-collecting device applying a tension force to said belt, means for detachably holding said belt extended away from and in front of said seat, and means connecting said belt-holding means with at least one conventional vehicle component to detach said belt from said belt-holding means in response to activation of said vehicle component to release said belt for collection in said belt-collecting device, said belt-holding means comprising a housing having a guiding means and including a tongue movable generally transversely to the direction of said belt, said tongue coacting with a recess in a buckle member, said buckle member being attached to the portion of said belt held forwardly and detachably by said belt-holding means.

3. A vehicle as claimed in claim 2, wherein said safety belt comprises three sections, each one of said sections being attached to its respective attachment point, two of said attachment points being located on said vehicle door and the third one of said attachment points being located on a belt-collecting device situated on said side of said seat remote from said door, and a belt buckle adjacent the junction point of said belt sections.

4. A vehicle having a door and an adjacent seat and at least one self-adjusting safety belt, means attaching said belt to at least one attachment point on the door adjacent said seat served by said belt, means attaching said belt to a further attachment point on the opposite side of said seat, at least one of said belt attachment means including a latachable belt-collecting device applying a tension force to said belt, means for detachably holding said belt extended away from and in front of said seat, and means connecting said belt-holding means with at least one conventional vehicle component to detach said belt from said belt-holding means in response to activation of said vehicle component to release said belt for collection in said belt-collecting device, said belt-holding means comprising an elongated housing having a lead-in and including a tongue movable generally transversely to the length of said housing, said tongue coacting with a recess in said buckle member, said buckle member being attached to the portion of said belt held forwardly and detachably by said belt-holding means.

* * * * *

UNITED STATES PATENT OFFICE
CERTIFICATE OF CORRECTION

PATENT NO. : 3,865,397
DATED : February 11, 1975
INVENTOR(S) : Stig Tore Lennart PILHALL, Pehr Harald Benedictus SCHALIN, Nils Ivar BOHLIN and Rolf Hermann FORSBERG It is certified that error appears in the above-identified patent and that said Letters Patent are hereby corrected as shown below:

Item [45] on the title page, change "Feb. 11, 1974" to

--Feb. 11, 1975--.

Signed and sealed this 27th day of May 1975.

(SEAL)
Attest:

RUTH C. MASON
Attesting Officer

C. MARSHALL DANN
Commissioner of Patents
and Trademarks